UNITED STATES PATENT OFFICE.

HERMANN WAGNER AND JOSEF ERBER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

YELLOW DYESTUFFS AND PROCESS OF MAKING SAME.

1,160,471. Specification of Letters Patent. Patented Nov. 16, 1915.

No Drawing. Application filed June 25, 1913. Serial No. 775,772.

*To all whom it may concern:*

Be it known that we, HERMANN WAGNER, Ph. D., chemist, and JOSEF ERBER, Ph. D., chemist, citizens of the Empire of Germany, residing at Höchst-on-the-Main, Germany, have invented certain new and useful Improvements in Yellow Dyestuffs and Processes of Making Same, of which the following is a specification.

We have found that by combining the tetrazo compounds of the diaminotriphenylmethanes with pyrazolones, dyestuffs are obtained of the general formula:

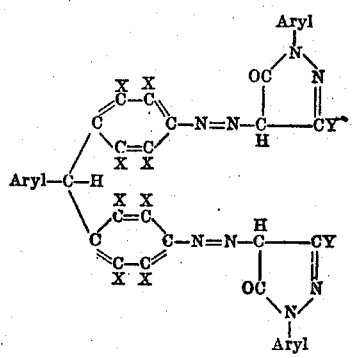

wherein X stands for a hydrogen or halogen atom or for a nitro-, alkyl- or alkyloxy- group; and Y for hydrogen, a methyl-or carboxyl-group. They are yellow to orange powders, soluble in concentrated sulfuric acid to a yellow solution, insoluble in ether, benzene and carbon tetrachlorid, difficultly soluble in alcohol; owing to the excellent fastness they possess, they are of great value for wool- and silk-dyeing as well as for the preparation of color-lakes.

The preparation of the said new dyestuffs may, for instance, be carried out according to the following examples:

Example I: The tetrazo compound produced in the usual manner from 274.3 kilos of diaminotriphenylmethane is run into an aqueous solution, prepared by means of caustic soda-lye and sodium carbonate, of 417 kilos of 1-(2-chlorphenyl)-3-methyl-5-pyrazolone. After the combination is complete, the dyestuff is isolated in the usual manner. The combination may also be effected in acetic acid solution.

Example II: The tetrazo compound produced from 274 kilos of diaminotriphenylmethane is combined with a solution, alkaline with sodium carbonate, of 577.5 kilos of 1-(2-chloro-5-sulfophenyl)-3-methyl-5-pyrazolone. After the combination is complete, the dyestuff is salted out. It is a yellow powder, and has the constitutional formula:

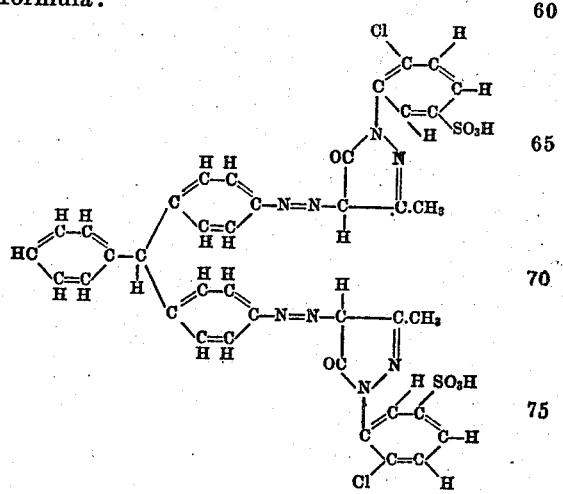

It dyes wool and silk pure yellow tints with a green hue, which are remarkable for their excellent fastness to milling and to the action of light and sulfur.

Having now described our invention, what we claim is:

1. The process of manufacturing yellow dyestuffs suitable for wool- and silk-dyeing and for the preparation of color-lakes, which consists in combining the tetrazo compounds of the diaminotriphenyl-methanes with pyrazolones.

2. As new articles of manufacture, the dyestuffs having the nucleus:

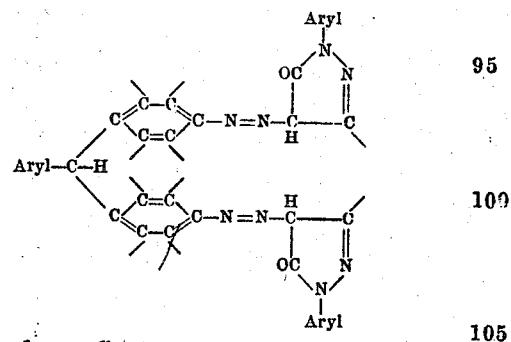

which dyestuffs are yellow to orange powders, soluble in concentrated sulfuric acid with a yellow color, insoluble in ether, benzene and carbon tetrachlorid, difficultly soluble in alcohol, and suitable for wool- and silk-dyeing and for the preparation of color-lakes.

3. As a new article of manufacture, the dyestuff of the constitutional formula:

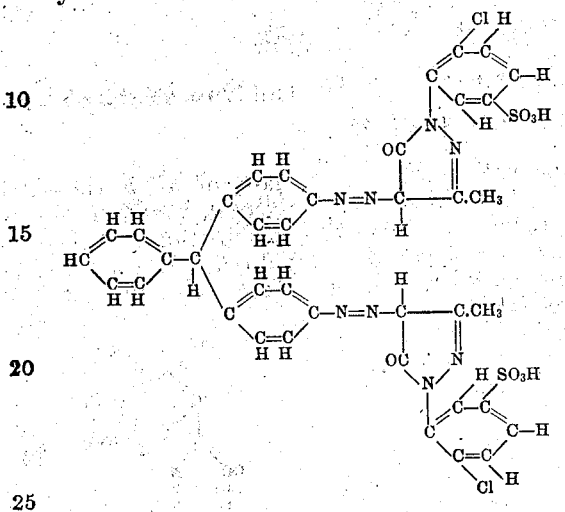

said dyestuff being a yellow powder, soluble in concentrated sulfuric acid with a yellow color, insoluble in ether, benzene and carbon tetrachlorid, difficultly soluble in alcohol, and suitable for wool- and silk-dyeing and for the preparation of color-lakes.

4. The process of producing yellow disazo dyestuffs which consists in combining the tetrazo compounds of the diaminotriarylmethanes with pyrazolones.

5. As new articles of manufacture, the disazo dyestuffs having the nucleus:

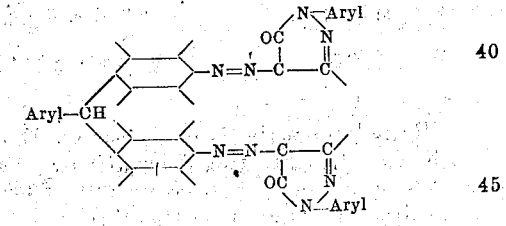

which dyestuffs are in the dry state yellowish powders, dyeing animal fibers greenish yellow to orange yellow shades, and which yield on being reduced a diaminotriarylmethane compound and an aminopyrazolone.

In testimony whereof, we affix our signatures in presence of two witnesses.

HERMANN WAGNER.
JOSEF ERBER.

Witnesses:
JEAN GRUND,
CARL GRUND.